Figure 1:
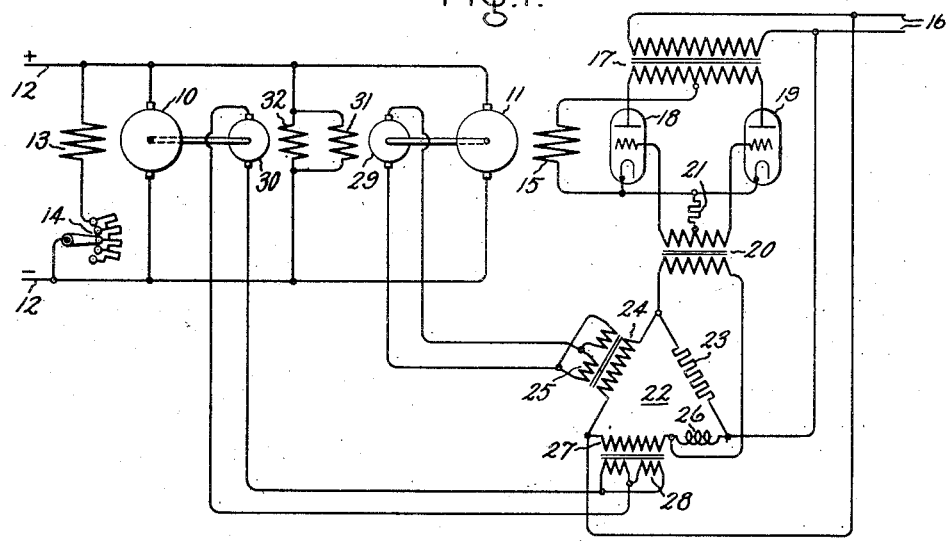

Sept. 12, 1933.  A. S. FITZ GERALD  1,926,275
ELECTRIC REGULATOR
Filed July 20, 1931

Inventor:
Alan S. FitzGerald,
by Charles E. Tullar
His Attorney.

Patented Sept. 12, 1933

1,926,275

UNITED STATES PATENT OFFICE 1,926,275

ELECTRIC REGULATOR

Alan S. Fitz Gerald, Wynnewood, Pa., assignor to General Electric Company, a corporation of New York Application July 20, 1931. Serial No. 551,852

6 Claims. (Cl. 171—119)

My invention relates to apparatus for regulating an electrical condition of a dynamo-electric machine or circuit, and more particularly to such apparatus utilizing electric valves for effecting the desired regulation. My invention relates further to an impedance phase shifting circuit which is particularly suitable for controlling the electric valves of my improved regulating apparatus.

Heretofore there have been proposed various arrangements including electric valves for regulating an electrical condition of a dynamo-electric machine or circuit. Certain of these arrangements of the prior art have effected the desired regulation by controlling the phase relation between the grid and anode potentials of the electric valves. Impedance phase shifting circuits have been found to be very satisfactory and inexpensive sources of variable phase grid potential. In the impedance phase shifting circuits of the prior art, however, it has not been possible to produce a potential variable in phase differentially in response to two or more controlling forces. In the improved regulating apparatus which constitutes one feature of my invention, it is desirable to have a grid control potential which is variable in phase differentially in response to two controlling forces.

It is an object of my invention, therefore, to provide an improved impedance phase shifting circuit which will overcome the above mentioned disadvantages of the arrangements of the prior art, and which will be simple and economical in operation.

It is another object of my invention to provide an improved impedance phase shifting circuit for producing a potential variable in phase differentially in response to two or more controlling forces.

It is a further object of my invention to provide an improved phase shifting circuit for producing a potential variable in phase with respect to that of an alternating current circuit in accordance with variations of a unidirectional potential and variable in phase in an opposite sense in response to corresponding variations of a second unidirectional potential.

It is a still further object of my invention to provide an improved control circuit for maintaining a secondary direct current motor in synchronism with a primary direct current motor and in which the excitation of the secondary direct current motor is controlled by an electric valve which in turn is controlled from my improved phase shifting circuit.

In accordance with one embodiment of my invention a potential variable in phase with respect to that of an alternating current circuit is produced by means of two parallel circuits connected across the alternating current circuit. One of the parallel circuits includes a saturable reactor and a resistor while the other circuit includes a saturable reactor and a non-saturable reactor. Each of the saturable reactors is provided with a saturating winding adapted to be energized from an independent source of control potential. The variable phase potential may be derived from any of a number of the circuit elements but is preferably obtained from a circuit joining the common connections of the elements of the two parallel circuits. In the application of this improved phase shifting circuit to the synchronizing of a primary and secondary direct current motor, the secondary direct current motor is excited through an electric valve which is controlled by the output potential of my improved impedance phase shifting circuit.

Each of the saturating windings of the saturable reactors is excited from a pilot generator driven by one of the direct current motors. In this way an increase in speed of the primary motor will shift the phase of the grid potential of the electric valve so as to decrease the excitation of the secondary motor and increase its speed and vice versa, while a tendency of the secondary motor to increase its speed will retard the grid excitation of the electric valve to increase its excitation and decrease its speed to the normal value. In case my improved phase shifting circuit is to be used in connection with regulating apparatus in which the desired regulation or control may be obtained by merely reversing the phase relation of the grid potential of the electric valve, the embodiment described above may be modified by replacing the circuit comprising the saturable reactor and resistor by a single inductive winding with a midtap and providing both of the reactors of the other circuit with saturating windings.

For a better understanding of my invention, together with other and further objects thereof, reference is had to the following description taken in connection with the accompanying drawing and its scope will be pointed out in the appended claims. Fig. 1 of the accompanying drawing illustrates one embodiment of my invention as applied to a regulating apparatus for synchronizing primary and secondary direct current motors, Fig. 2 illustrates a modified form of my invention, while Fig. 3 is a vector diagram to aid in the understanding of my invention.

Referring now to Fig. 1 of the drawing, I have illustrated an arrangement for synchronizing a primary direct current motor 10 and a secondary direct current motor 11 which are energized from a direct current circuit 12. The primary motor 10 is provided with a field winding 13 which may be energized from the circuit 12 through any suitable regulating apparatus such for example as a manually operable rheostat 14, by means of which the speed of the motor 10 may be controlled. Similarly the motor 11 is provided with a field winding 15 which is energized from a source of alternating current 16 through a transformer 17 and electric valves 18 and 19 connected in a conventional manner for obtaining full wave rectification. Electric valves 18 and 19 are each provided with an anode, a cathode and a control grid and may be of any of the several types well known in the art, although I prefer to use valves of the vapor electric discharge type. The grids of the valves 18 and 19 are connected to their common cathode circuit through opposite halves of the secondary winding of a grid transformer 20 and a current limiting resistor 21. In order to maintain the secondary motor 11 in synchronism with the motor 10, that is, in order that the motor 11 may follow the variations in speed of the motor 10, the excitation of the motor 11 is adapted to be regulated by varying the phase relation of the grid potentials of electric valves 18 and 19 from my improved phase shifting circuit 22. Phase shifting circuit 22 comprises two parallel circuits, one consisting of a resistor 23 and a saturable reactor 24 provided with a saturating winding 25, and the other consisting of a non-saturable reactor 26 and a saturable reactor 27 provided with a saturating winding 28. However, I do not claim broadly the use of a saturable reactor in an impedance phase shifting circuit for this is disclosed and claimed in a copending application of Myron Zucker, S. N. 530,878, filed April 17, 1931, and assigned to the same assignee as the present application. Saturating windings 25 and 28 are energized in accordance with the speed of the motors 11 and 10 respectively, as by connecting them across pilot generators 29 and 30, respectively, driven directly from the motors 11 and 10. The pilot generators 29 and 30 are provided with field windings 31 and 32 respectively, which may be energized from any suitable source of constant potential, such for example as the direct current circuit 12.

In explaining the operation of the above described apparatus, it will be assumed that initially the motors 10 and 11 are running at the same speed and that the saturation of reactors 24 and 27 due to the pilot generators 29 and 30, respectively, is such that the phase relation of the potentials applied to the grids of the valves 18 and 19 with respect to their anode potentials is of the proper value to supply a correct excitation to the motor 11 for the given speed. These conditions are illustrated by the vector diagram of Fig. 3 in which the vector OA represents the anode potential of electric valves 18 and 19, the vector OB represents the potential across the resistor 23, the vector BA the potential across reactor 24, the vector OC the potential across reactor 26 and the vector CA the potential across reactor 27. Assume now that with the same load upon motors 10 and 11, it is desired to increase the speed of these motors. Obviously the speed of the motor 10 may be increased by increasing the resistance 14 in its field circuit. As the speed of the motor 10 increases the potential developed by the pilot generator 30 will increase correspondingly and with it the saturation of reactor 27. An increase in the saturation of reactor 27 decreases its impedance and its impedance drop so that the point C shifts to the point C' and the grid potential of the valves 18 and 19 is now represented by the vector C'B, which, it is seen, is retarded in phase with respect to the initial grid potential represented by the vector CB. By retarding the phase of the grid potentials of valves 18 and 19 the excitation of the motor 11 is decreased, as is well understood by those skilled in the art, and its speed will correspondingly increase. Obviously if the speed of the motor 10 is decreased, the reverse operation will take place. On the other hand, if the load on the motors 10 and 11 is proportionately decreased according to their rating, these motors will both increase in speed in the same amount. For example, assume that the speed of the motor 10 is increased to such a value that the point C is moved to the point C' as in the previous assumption. In this case, however, the saturation of the reactor 24 will be correspondingly increased, its impedance will be decreased with the result that the point B is shifted to the point B'. Under these conditions it is apparent that the grid potential, which is represented by the vector C'B', has the same phase relation as before the change in C, so that the motor 11 will maintain the increase in speed and remain in synchronism with the motor 10. From the above, it is apparent that the motor 11 will follow any variations in speed of the motor 10 whether due to a change in excitation of the motor 10 or due to changes in the load on the motors 10 and 11.

Figure 2:
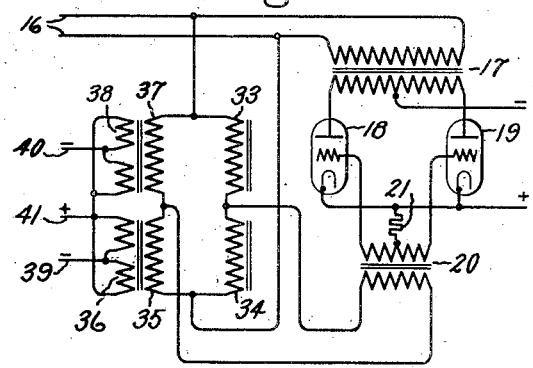
Figure 3:
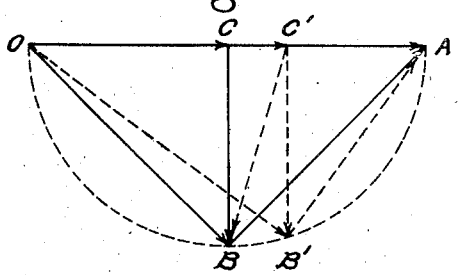

In case it is only necessary to reverse the grid potential of an electric valve in response to two controlling forces, my invention may take the form illustrated in Fig. 2. In this arrangement the impedance phase shifting circuit comprises two parallel circuits connected across the alternating current circuit 16 and consisting of two non-saturable reactors 33 and 34, or their equivalent of a single midtapped inductive winding, and the other consisting of the saturable reactors 35 and 37 provided with saturating winding 36 and 38 respectively. The saturating windings 36 and 38 are adapted to be energized from control circuits 39 and 40 which may be energized from any desired sources of controlling electromotive force and are illustrated as having a common connection 41. In this arrangement the potential derived from the phase shifting circuit for exciting the grids of the valves 18 and 19 is not continuously variable in phase as in the arrangement shown in Fig. 1, but is reversible in phase in response to the differential effect of the control circuits 39 and 40. Thus if the controlling potentials of the circuits 39 and 40 either increase or decrease simultaneously, the grid potentials of the valves 18 and 19 will not be affected, but if the controlling potential of only one circuit decreases, or in case the control potentials of the circuits change in an opposite sense, the grid potentials supplied to valves 18 and 19 will be reversed in phase to either render the valves 18 and 19 completely conductive or non-conductive according to the application to which they are put. For example, such a phase shifting arrangement may be applied directly to the regulating apparatus of Fig. 1 in order to produce a regulation of the so-called dynamic type; that is, one in which the excitation of the field 15 is intermittent, the relative duration of the intervals during which the winding is excited and during which it is deenergized determining the average speed of the motor 11.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In combination, a source of alternating potential, means for supplying a plurality of controlling forces, and means for producing a potential variable in phase with respect to that of said source comprising a circuit including a plurality of impedance elements connected across said source, means for deriving a potential from said circuit, means for varying the impedance of one of said elements in accordance with variations of one of said forces, and means for varying the impedance of another of said elements in accordance with variations in another of said forces and in such a direction as to act differentially with respect to said first force in varying said derived potential.

2. In combination, a source of alternating potential, means for supplying a pair of controlling forces, and means for producing a potential variable in phase with respect to that of said source comprising an impedance bridge one diagonal of which is connected across said source, an output circuit connected to the other diagonal, and means for controlling the impedance of each of two arms of said bridge by one of said forces, said forces cooperating to act differentially with respect to their effect on the potential of the output circuit.

3. In combination, a source of alternating potential, means for supplying two controlling electromotive forces, and means for producing a potential variable in phase with respect to that of said source comprising an impedance bridge connected across said source, two of the arms of said bridge each comprising a saturable reactor provided with a saturation winding and each of said saturating windings being energized from one of said electromotive-forces.

4. In combination, a source of alternating potential, means for supplying a plurality of controlling forces, and means for producing a potential variable in phase with respect to that of said source comprising a plurality of impedance elements connected across said source for producing dephased potentials, means for varying the impedance of one of said elements in accordance with variations of one of said forces, and means for varying the impedance of another of said elements in accordance with variations of another of said forces and in such a direction as to act differentially with respect to said first force in dephasing said potentials.

5. In combination, a source of alternating potential, means for supplying a pair of controlling electromotive-forces, and means for producing a potential variable in phase with respect to that of said source comprising a pair of impedance elements including a saturable reactor connected across said source for producing dephased potentials, a second pair of impedance elements including a second saturable reactor connected in parallel to said first pair, and means for saturating each of said saturable reactors by means of one of said electromotive-forces.

6. In combination, a source of alternating potential, means for supplying a pair of controlling electromotive-forces, and means for producing a potential reversible in phase with respect to that of said source comprising a reactance bridge connected across said source, two adjacent arms of said bridge comprising saturable reactors provided with saturating windings, each of said saturating windings being energized from one of said electromotive-forces.

ALAN S. FITZ GERALD.